(12) United States Patent
Xie

(10) Patent No.: US 8,014,623 B2
(45) Date of Patent: Sep. 6, 2011

(54) SYSTEM AND METHOD FOR EFFICIENTLY ENHANCING VIDEOS AND IMAGES

(75) Inventor: Ian Xie, Emeryville, CA (US)

(73) Assignee: Ipera Technology, Inc., San Mateo, CA (US)

( * ) Notice: Subject to any disclaimer, the term of this patent is extended or adjusted under 35 U.S.C. 154(b) by 984 days.

(21) Appl. No.: 11/925,744

(22) Filed: Oct. 26, 2007

(65) Prior Publication Data

US 2008/0123984 A1    May 29, 2008

Related U.S. Application Data

(60) Provisional application No. 60/867,625, filed on Nov. 29, 2006.

(51) Int. Cl.
*G06K 9/40* (2006.01)
(52) U.S. Cl. ......... 382/254; 382/260; 382/274; 382/276
(58) Field of Classification Search .................. 382/254, 382/260, 274, 276
See application file for complete search history.

(56) References Cited

U.S. PATENT DOCUMENTS

| | | | | |
|---|---|---|---|---|
| 5,461,655 A | * | 10/1995 | Vuylsteke et al. | 378/62 |
| 5,561,611 A | * | 10/1996 | Avinash | 702/111 |
| 5,850,471 A | * | 12/1998 | Brett | 382/162 |
| 6,469,747 B1 | * | 10/2002 | Rai et al. | 348/584 |
| 6,987,892 B2 | * | 1/2006 | Edgar | 382/254 |

* cited by examiner

*Primary Examiner* — Jingge Wu
*Assistant Examiner* — Stephen R Koziol
(74) *Attorney, Agent, or Firm* — Richard T. Ogawa; Ogawa P.C.

(57) ABSTRACT

System and method for efficiently enhancing videos and images. According to an embodiment, the present invention provides a method for processing videos and/or images. The method includes providing a target pixel that is characterized by a first pixel value. The method further includes obtaining a plurality of surrounding pixels that are positioned within a predetermined area surrounding the target pixel. Also, the method includes selecting a transition pixel from the plurality of surrounding pixels. The transition pixel is characterized by a second pixel value. The transition pixel is associated with a greatest transition value that is a function of the first pixel value and the second pixel value. The method additionally includes determining a first direction, the first direction being parallel to a second direction from the target pixel to the transition pixel.

29 Claims, 10 Drawing Sheets

SYSTEM AND METHOD FOR EFFICIENTLY ENHANCING VIDEOS AND IMAGES

CROSS-REFERENCES TO RELATED APPLICATIONS

This application claims priority from U.S. Provisional Application No. 60/867,625 filed Nov. 29, 2006, which is incorporated by reference herein.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates in general to video and image processing techniques. More particularly, the invention provides a method and system for automatically enhancing videos and images. Merely by way of example, the invention is described as it applies to efficiently processing video and images for viewing, but it should be recognized that the invention has a broader range of applicability. In a specific embodiment, the present invention provides a technique for efficiently adjusting peaking, noise, contrast, and brightness level. But it is to be understood that there are other utilities and implementations as well.

Over the last decade, with the advent of consumer electronics and more specifically media players (e.g., DVD player, player computer, portable multimedia devices, cellular phones, etc.) are used for playing media contents in various formats. For a variety of reasons, media contents often need to be processed (e.g., enhanced, adjusted, etc.) before they are presented for viewing and/or other purposes.

There are various types of processes that can be performed to enhance video and/or image quality. For example, these processes include peaking, noise reduction, contrast enhancement, and brightness adjustment. There are enhancement and/or adjustments as well.

There are a number of conventional techniques to provide enhancement and/or adjustments. Unfortunately, these conventional techniques are often inadequate.

Hence it is highly desirable to improve techniques for efficiently and effectively enhancing and/or adjusting videos and images.

BRIEF SUMMARY OF THE INVENTION

The present invention relates in general to video and image processing techniques. More particularly, the invention provides a method and system for automatically enhancing videos and images. Merely by way of example, the invention is described as it applies to efficiently processing video and images for viewing, but it should be recognized that the invention has a broader range of applicability. In a specific embodiment, the present invention provides a technique for efficiently adjusting peaking, noise, contrast, and brightness level. But it is to be understood that there are other utilities and implementations as well.

According to an embodiment, the present invention provides a method for processing videos and/or images. The method includes providing a target pixel that is characterized by a first pixel value. The method further includes obtaining a plurality of surrounding pixels that are positioned within a predetermined area surrounding the target pixel. Also, the method includes selecting a transition pixel from the plurality of surrounding pixels. The transition pixel is characterized by a second pixel value. The transition pixel is associated with a greatest transition value that is a function of the first pixel value and the second pixel value. The method additionally includes determining a first direction, the first direction being parallel to a second direction from the target pixel to the transition pixel. Furthermore, the method includes determining a line of surrounding pixels that is characterized by a third direction, which is perpendicular to the second direction. The method additionally includes determining a noise compensation value, which is a function of the first pixel value and pixel values of the line of surrounding pixels. Additionally, the method includes determining a peaking compensation value that is a function of the first pixel value and the second pixel value. Moreover, the method includes adjusting the first pixel value based on at least the noise compensation value and the peaking compensation value.

According to another embodiment, the present invention provides method for processing videos and/or images. The method includes providing a frame that includes a known number of pixels. The method also includes determining a global mean that is a first luminance value associated with the known number of pixels. The method also includes selecting three horizontal lines of pixels. Also, the method includes buffering the three horizontal lines of pixels, which includes a top line, a middle line, and a bottom line. The method also includes selecting a target pixel from the middle line. The target pixel is characterized by at least a second luminance value. The method further includes selecting eight surrounding pixels that are adjacent to the target pixel. Furthermore, the method includes determining a first direction based on a transition between the target pixel and a transition pixel that is one of the eight surrounding pixels. The method includes determining a second direction that is perpendicular to the first direction. The method additionally includes determining a peaking compensation value that is associated with the first direction. Also, the method includes determining a noise compensation value that is associated with the second direction. In addition, the method includes determining a contrast compensation value based on the global mean and a local mean. Moreover, the method includes determining a brightness compensation value based on the global mean and the first luminance level. In addition, the method includes modifying the target pixel and displaying the frame.

According to yet another embodiment, the present invention provides a method for processing videos and/or images. The method includes receiving a frame that is characterized by a first number of horizontal lines and a second number of pixels. The method also includes determining a global mean for the second number of pixels. The method further includes storing a first line, a second line, and a third line of pixels at a buffer. Additionally, the method includes performing at least a first brightness adjustment for the second line of pixels based on the global mean. Furthermore, the method includes performing at least a first contrast adjustment for the second line of pixels based on information from the first line and the third line of pixels. The method also includes removing the first line of pixels from the buffer. The method additionally includes storing a fourth line of pixels at the buffer. Moreover, the method includes performing at least a second contrast adjustment for the third line of pixels based on information from the second line and the fourth line of pixels. In addition, the method includes performing at least a second brightness adjustment for the third line of pixels based on the global mean. The method includes displaying the frame.

According to yet another embodiment, the method includes a system for processing videos and/or images. The system includes a storage that is configured to store at least a frame, the frame being characterized by a first number of horizontal lines and a second number of pixels. The system also includes a buffer memory. The system additionally includes a processor. Furthermore, the system includes a user interface and a display. The processor is configured to determine a global mean for the second number of pixels. The buffer memory is configured to store a first line, a second line, and a third line of pixels. The processor is further configured to perform at least a first brightness adjustment for the second line of pixels based on the global mean. The processor is further configured to perform at least a first contrast adjustment for the second line of pixels based on information from the first line and the third line of pixels. The buffer memory is configured to remove the first line of pixels and to store a fourth line of pixels after the first contrast adjustment and the first brightness adjustment are performed. The processor is further configured to perform at least a second contrast adjustment for the third line of pixels based on information from the second line and the fourth line of pixels. The processor is further configured to perform at least a second brightness adjustment for the third line of pixels based on the global mean.

It is to be appreciated that embodiments according to the present invention offer various advantages over conventional techniques. For example, the embodiments of the present invention provide an integrated and efficient solution for enhancing videos and/or images. In a specific embodiment, the present invention provides a mechanism for saving computational resources by using novel and advanced image processing techniques. In another embodiment, the present invention provides a technique for performing different enhancements (e.g., peaking adjustment and noise reduction) in parallel, thus reducing processing time. Furthermore, embodiments of the present invention can be integrated into conventional software and hardware systems with ease. There are other benefits as well.

Various additional objects, features and advantages of the present invention can be more fully appreciated with reference to the detailed description and accompanying drawings that follow.

DETAILED DESCRIPTION OF THE INVENTION

Figure 1:
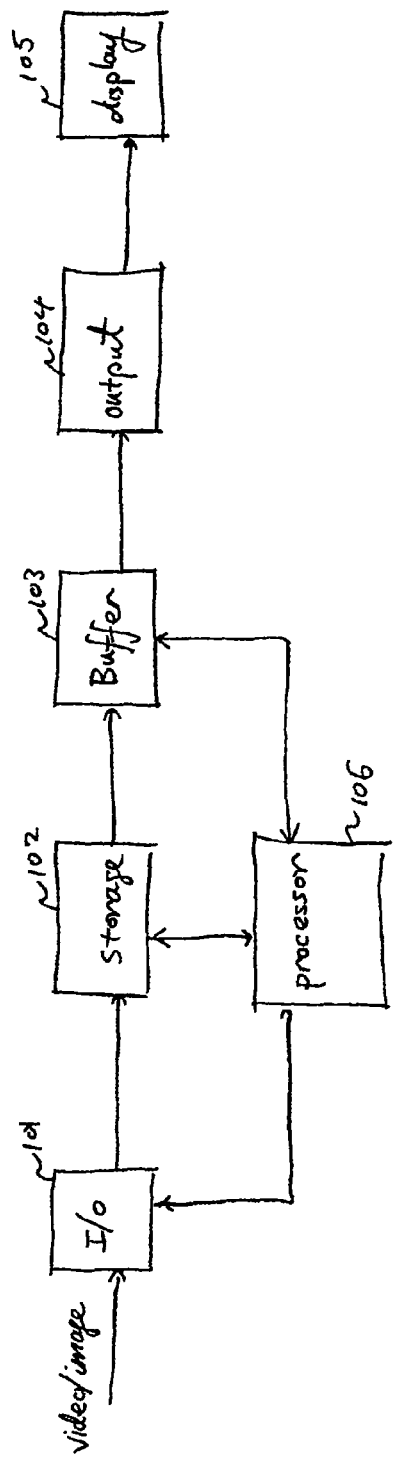
FIG. 1 is a simplified diagram illustrating a system 100 according to an embodiment of the present invention.

The present invention relates in general to video and image processing techniques. More particularly, the invention provides a method and system for automatically enhancing videos and images. Merely by way of example, the invention is described as it applies to efficiently processing video and images for viewing, but it should be recognized that the invention has a broader range of applicability. In a specific embodiment, the present invention provides a technique for efficiently adjusting peaking, noise, contrast, and brightness level. But it is to be understood that there are other utilities and implementations as well.

As discussed above, conventional video processing techniques while effective in their own ways, are often inadequate for video playback applications, for which both speed and quality are important.

Noise reduction for video playback is an important and useful feature. Noises are typically undesirable artifacts that are introduced to video and/or images from various sources. For example, for video captured at low-light conditions using digital image sensors often include pronounced thermal noises. As another example, noise is often introduced during transmission and reproduction of video and/or images. Over the past, various techniques have been developed to reduce noise from video and/or images. Many of these conventional techniques are highly effective. Unfortunately, these conventional techniques are often computation intensive and are therefore unsuitable for real time application such as video playback.

Peaking enhancement is another useful feature in video processing. Peaking enhancement strengths transitions between contrasting pixels in an image and/or video frame, thereby enhances edges definition and sharpness. Over the past, man research efforts has been put into this area. For example, most of linear and non-linear peaking algorithms embedded with some coring operations add a certain amount of medium- and high-frequency components back upon original signals, where mentioned medium- and high-frequency components are obtained by subtraction of low-frequency components from original signals and those low-frequency components are obtained by low-pass filtering original signals. To summarize, the operation of peaking algorithms is to choose a suitable low-pass filter that is able to remove medium- and high-frequency components along those directions not belonging to authentic edges that shall be left unchanged as many as possible. Unfortunately, this goal is difficult to achieve due to the complexity of designing such anisotropic two-dimensional filters, especially sometimes a rather high filter order is required that increases cost of hardware implementations, and the problem is further complicated by the lack of adaptation of a fixed low-pass filter. In addition, like conventional noise reduction techniques, most of the conventional peaking enhancement techniques are not fast enough for real time applications.

In addition to peaking and noise reduction, there are other useful adjustments for video processing as well. Dynamic contrast adjustment and brightness enhancement are often essential in various situations. Algorithms for dynamic contrast and brightness enhancement are typically based on explicit or implicit histogram mapping using a transformation curve, including global and local approaches. For example, an explicit mapping approach offers a modified histogram equalization ("HE") approach mainly by measuring a so-called global contrast that is utilized as an indicator to determine degree of HE transformation, which lies a drawback that some local details may be ignored or lost. In addition, such algorithm often introduces flickering, in which transient images or scene change when applying HE approaches. On the other hand, conventional implicit mapping methods uses a global stretching approach. Unfortunate, it is inadequate as well for many applications, as uses logarithmic functions as such causes dramatic increases the cost of the hardware implementations, and these algorithms fail to take local details into consideration.

The abovementioned conventional techniques often need to used together, preferably in one integrated process, for real time applications such as video playback, recording, etc. However, it has been difficult to use these conventional techniques together. For example, noise contained in images and video is usually amplified by both peaking and dynamic contrast and brightness enhancement algorithms. While the use of low-pass filtering can suppress noise to some extent in peaking algorithms, it also, as mentioned above, suppresses information of authentic edges. Meanwhile, when dark or bright parts of images and video are stretched, noise is bulged because discrepancies between values of adjacent pixels are usually enlarged.

It is therefore to be appreciated that various embodiments of the present invention provide efficient and effective techniques that improve video and/or image qualities. In an embodiment, the present invention provides an integrated process for directional peaking, directional noise reduction, dynamic contrast, brightness enhancements for images and video.

Depending on the specific application, embodiments of the present invention may be implemented with various types of hardware systems. For example, general purpose computers, cellular phones, portable media players, media devices, televisions, vide players, cable boxes, as well as other devices, can be configured to implement techniques of the present invention.

FIG. 1 is a simplified diagram illustrating a system 100 according to an embodiment of the present invention. This diagram is merely an example, which should not unduly limit the scope of the claims. One of ordinary skill in the art would recognize many variations, alternatives, and modifications.

As shown in FIG. 1, the system 100 includes to following components:
1. an interface 101;
2. a storage 102;
3. a buffer 103;
4. an output 104;
5. a display 105; and
6. a processor 106;

The interface 101 is configured to receive video and/or images. For example, the interface 101 may be a network interface that receives video and/or image from a remote location. As another example, the interface 101 is configured to receive video and/or images from various media players. The storage 102 is configured to store video and/or images. In certain embodiments, the storage 102 is also configured to storage computer executable instructions. For example, the storage 102 includes a non-volatile memory such as hard disk drive, optical drive, etc.

The processor 106 is configured to computer executable instructions and to process videos and/or images. In a specific embodiment, the processor 106 is a general purpose processor (e.g., central processing units used in a general purpose computer). In another embodiment, the processor 106 is designed to perform video and/or image processing techniques according to embodiments of the present invention. The detail discussion of these techniques are provided below.

The system additionally includes an output displaying video and/or images. For example, the display 105 is an LCD display. The output 104 is configured to provide the processed video and/or images to other devices, such as external display units, remote network devices, and/or other media devices.

Figure 2:
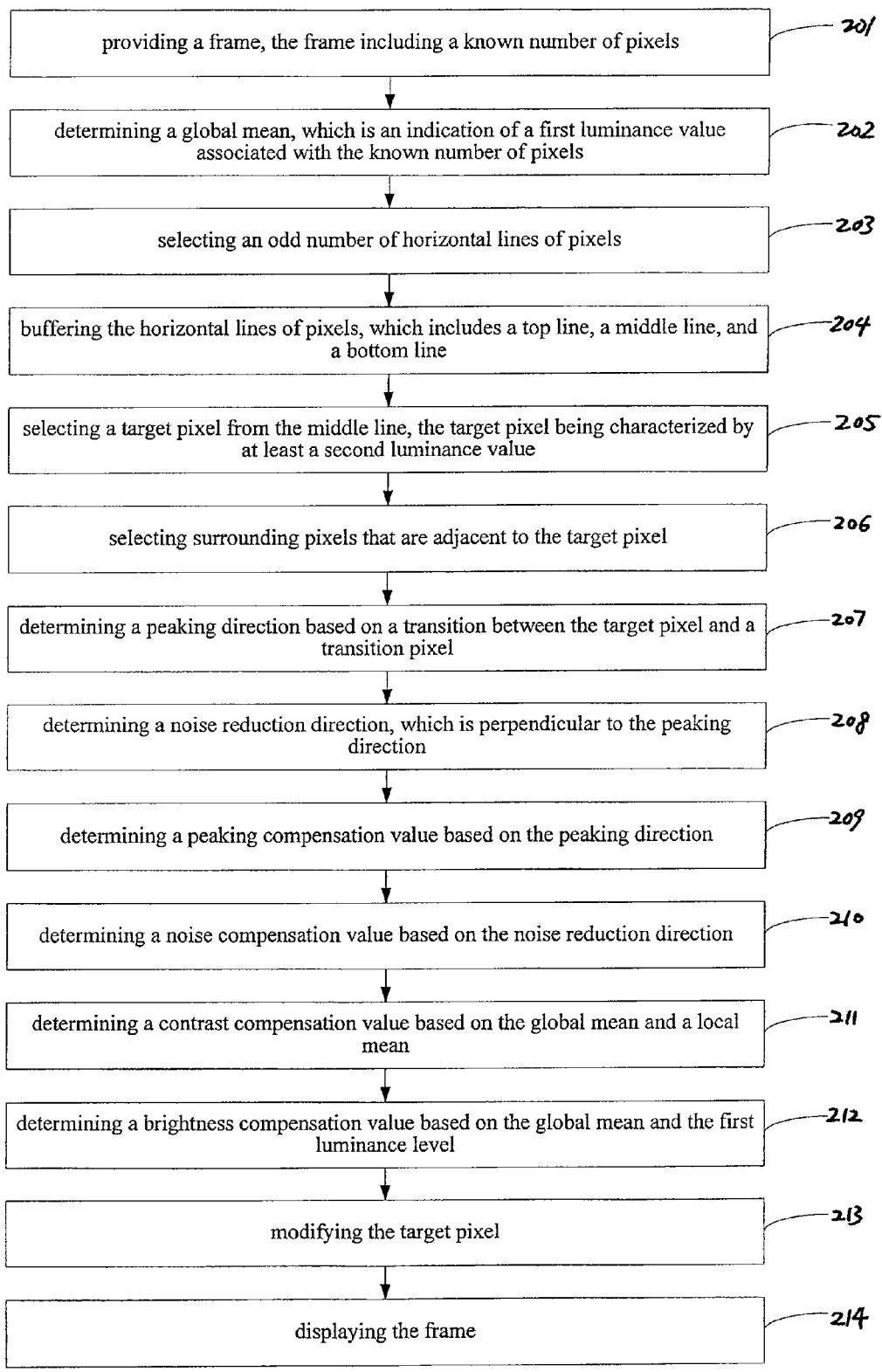
FIG. 2 is a simplified diagram illustrating a enhancement process 200 according to an embodiment of the present invention.

FIG. 2 is a simplified diagram illustrating a enhancement process 200 according to an embodiment of the present invention. This diagram is merely an example, which should not unduly limit the scope of the claims. One of ordinary skill in the art would recognize many variations, alternatives, and modifications. For example, various steps may be added, removed, modified, replaced, rearranged, repeated, overlapped, and/or partially overlapped, as contemplated within the scope of the present invention.

As shown in FIG. 2, the process 200 includes the following steps:
1. providing a frame, the frame including a known number of pixels (201);
2. determining a global mean, which is an indication of a first luminance value associated with the known number of pixels (202);
3. selecting an odd number of horizontal lines of pixels (203);
4. buffering the horizontal lines of pixels, which includes a top line, a middle line, and a bottom line (204);
5. selecting a target pixel from the middle line, the target pixel being characterized by at least a second luminance value (205);
6. selecting surrounding pixels that are adjacent to the target pixel (206);
7. determining a peaking direction based on a transition between the target pixel and a transition pixel (207);
8. determining a noise reduction direction, which is perpendicular to the peaking direction (208);
9. determining a peaking compensation value based on the peaking direction (209);
10. determining a noise compensation value based on the noise reduction direction (210);
11. determining a contrast compensation value based on the global mean and a local mean (211);
12. determining a brightness compensation value based on the global mean and the first luminance level (212);
13. modifying the target pixel (213);
14. displaying the frame (214);

At step 201, a frame is provided. Depending on the specific application, the frame my be an image or a frame of a video.

At step 202, a global mean is determined. According to a specific embodiment, the global mean is an average value of luminance level (e.g., brightness element in an image) of the frame. Depending on the image format of the frame, the global mean may be an average value of other properties (e.g., red level, green level, etc.) as well. In an embodiment, global mean is efficiently determined by a processor when the frame is provided. For example, luminance values for pixels of the frame are stored in a luminance value vector. The processor simply determines an average value using the luminance value vector.

At step 203, an odd number of lines of horizontal pixels are selected for processing. Depending on the application, three, five, and even more lines are selected for processing. Among the odd number of lines, the line positioned in the middle is targeted for processing and/or enhancement. Processing and/or enhancement is performed one pixel at a time for the middle line.

Figure 3:
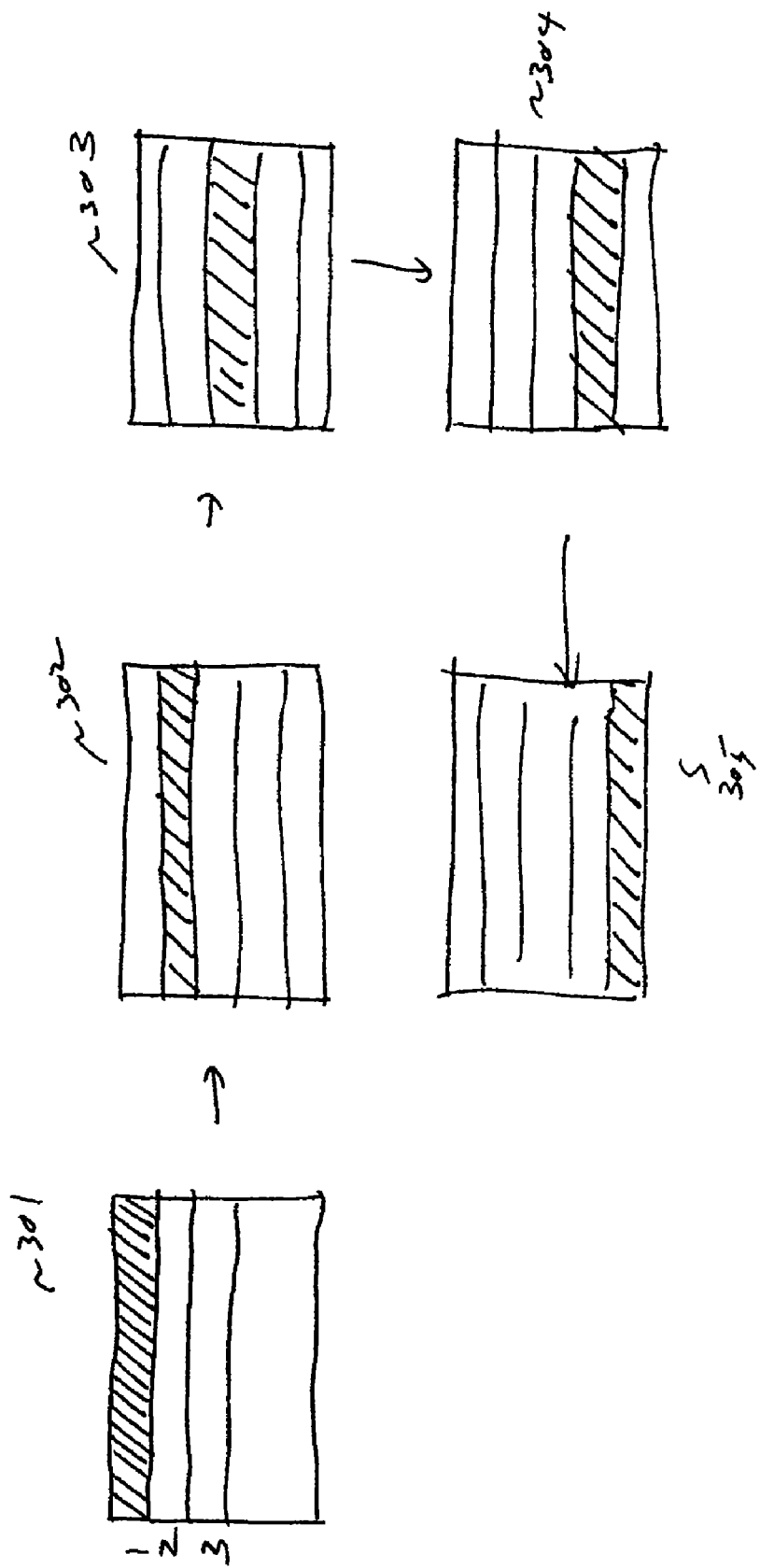
FIG. 3 is a simplified diagram illustrating a line selection process according to an embodiment of the present invention.

FIG. 3 is a simplified diagram illustrating a line selection process according to an embodiment of the present invention. This diagram is merely an example, which should not unduly limit the scope of the claims. One of ordinary skill in the art would recognize many variations, alternatives, and modifications.

As shown in diagram 301, line 1 is a target line that is to be processed. To enhance pixels at line 1, information from adjacent line(s) is needed. For example, 2, 4, 6, and even more number of adjacent lines are needed to process each target line. However, since line 1 is only adjacent to line 2, a "dummy" line (e.g., a copy of line 1 or line 2) can be used. When the line 2 is the target line (see diagram 302), lines 1 and 3 are selected also. For techniques that requires the use of more adjacent lines, additional lines are selected as well. For example, in a process 4 adjacent lines are needed, the line 3 as shown in diagram 303 needed lines 1, 2, 4, and 5 to be selected as well.

Now referring back to FIG. 2. At step 204, the selected lines of pixels are buffered. For example, the buffer is a memory that is relatively low-capacity and fast, such as cache memory or RAM. Among other things, the buffer allows quick access and processing by the processor.

At step 205, a target pixel is selected based on from the target line. According to an embodiment, pixels in the frame are processed one at a time, from left to right.

Figure 4:
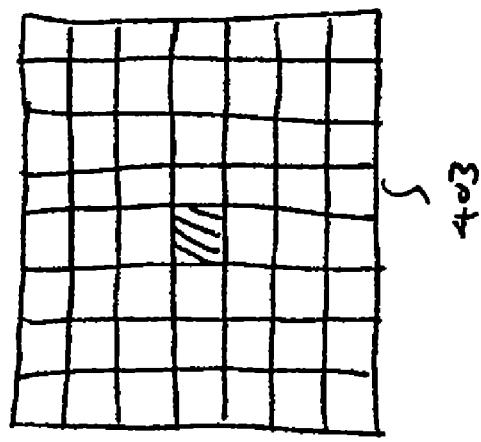
FIG. 4 is a simplified diagram illustrating processes for selecting pixels according to embodiments of the present invention.
Figure 4:
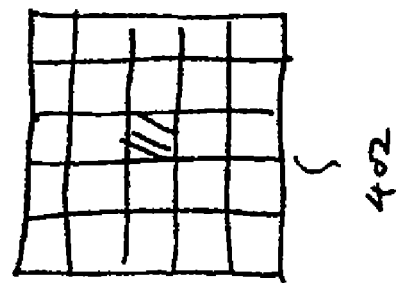
Figure 4:
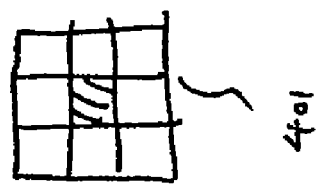

At step 206, surrounding pixels are selected. More specifically, an N by N sized pixels are selected, where N is an odd number. FIG. 4 is a simplified diagram illustrating processes for selecting pixels according to embodiments of the present invention. This diagram is merely an example, which should not unduly limit the scope of the claims. One of ordinary skill in the art would recognize many variations, alternatives, and modifications. In diagram 401, an 3×3 (i.e., a total of 9) pixels are selected. The shade pixel in the middle is the target pixel that is being processed. The surrounding eight pixels are selected and to be used for enhancing the target pixel. Similar, a group of 5×5 pixels (diagram 402), a group of 7×7 pixels (diagram 403), or even more pixels are selected.

Figure 5:
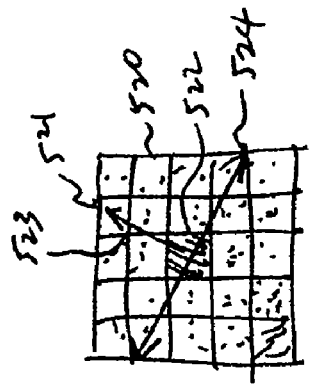
FIG. 5 is a simplified diagram illustrating peaking and noise directions according to an embodiment of the present invention.
Figure 5:
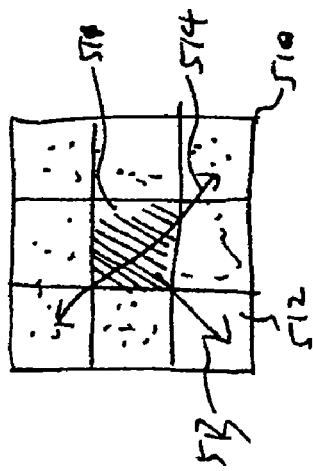
Figure 5:
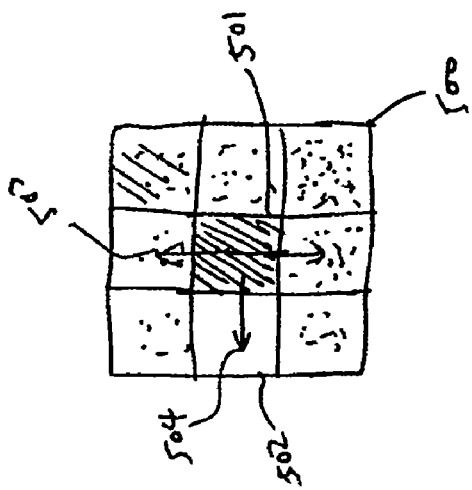

At step 207, a peaking direction is determined using the target pixel and the surrounding pixels. In particular, the peaking direction is associated with a maximum edge strength. In a specific embodiment, the peaking direction is defined as the direction from the target pixel to a surrounding pixel that has the great amount of transition (e.g., difference of luminance value between the target pixel and that surrounding pixel). FIG. 5 is a simplified diagram illustrating peaking and noise directions according to an embodiment of the present invention. This diagram is merely an example, which should not unduly limit the scope of the claims. One of ordinary skill in the art would recognize many variations, alternatives, and modifications.

In pixel group 501, there are nine pixels, with the target pixel 501 positioned at the center and eight surrounding pixels around the target pixel 501. To provide an example, the target pixel 501 is relative dark (e.g., with a luminance value close to zero). All the eight surrounding pixels are brighter, with the pixel 504 being the brightest (e.g., the luminance value is at the maximum, or value 255 in an 8 bits scheme). Therefore, the transition between the target pixel 501 and the pixel 504 is the greatest. Typically, such transition indicates that an edge and/or border of graphic elements exists between the two pixels. The peaking direction is the direction 504, which is the direction between the pixel 504 and the target pixel 501. Similarly, for pixel group 510, the peaking direction 513 is between the target pixel 511 (i.e., the dark pixel positioned in the center) and the pixel 512 (i.e., the brightest of the surrounding pixels). As an example, the peaking direction 521 (i.e., the dark pixel positioned in the center) the direction between the target pixel 522 and the pixel 521 (i.e., the brightest of the surrounding pixels). As can be seen from pixel group 520, with a greater number of surrounding pixels, a more precise and/or better result can be achieved.

Now referring back to FIG. 2. At step 208, a noise reduction direction is determined. According to embodiments, the noise direction is perpendicular (or orthogonal) to the noise reduction direction. For example, the peaking direction is essentially the normal of the authentic edge, and the noise reduction direction is essentially along the curvance of that authentic edge. For example, the direction 503 is the noise reduction direction for the pixel group 500, which is perpendicular to the peaking direction 504. Similarly, noise reduction direction for pixels groups 510 and 520 are respectively directions 514 and 524, which are perpendicular to the respective peaking directions.

At step 209, a peaking compensation value is determined. According to an embodiment, the peaking compensation value, which to be used to adjust the target pixel, is determined using an one-dimension peaking algorithm. For example, the peaking algorithm simply determine value to enhance the peaking and/or edge that is associated with the target pixel. In certain embodiments, the peaking compensation value is determined and adjustment is made using the peaking compensation value. In other embodiments, the peaking compensation value is used, as a factor along with other factor, in determine what adjustment is to be performed for the target pixel.

At step 210, a noise compensation value is determined. According to an embodiment, the noise compensation value, which to be used to adjust the target pixel, is determined using a low-pass filter. Depending on the application, other types of noise reduction algorithm may be used. In an embodiment, the noise compensation value is determined and adjustment is made using the noise compensation value, which may be done before or after the peaking compensation value is applied. In a preferred embodiment, a combined value is obtain by combining the peaking compensation value and the noise compensation value in a weighted-average manner, in which the weight is a function of the maximum edge strength so that a noise-reduced peaking result is produced.

At step 211, a contrast compensation value is determined. More specifically, the contrast compensation value is a function of local contrast (i.e., contrast of the selected N by N pixels). As an example, once determined, the contrast compensation value is used to adjust the target pixel.

Figure 6:
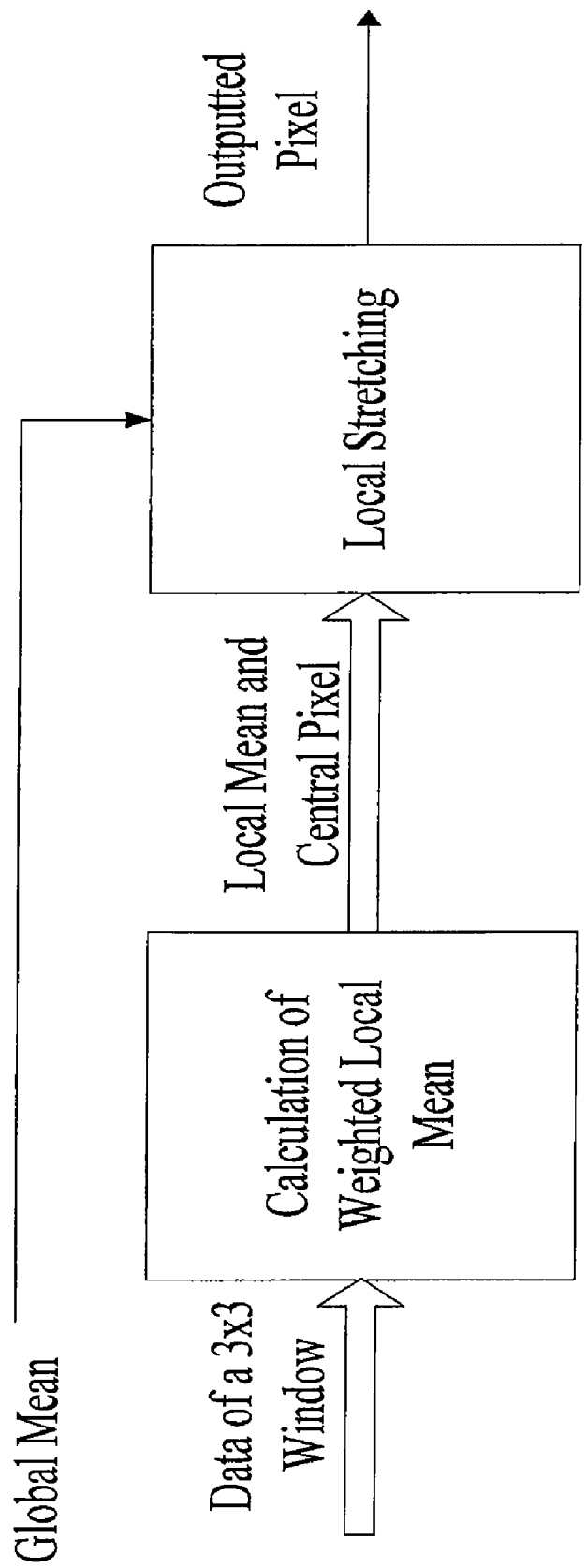
FIG. 6 is a simplified diagram illustrating a process for adjusting local contrasts.

FIG. 6 is a simplified diagram illustrating a process for adjusting local contrasts. This diagram is merely an example, which should not unduly limit the scope of the claims. One of ordinary skill in the art would recognize many variations, alternatives, and modifications. During the process for adjusting contrast, a group of N by N pixels are used. According to an embodiment, a local average (e.g., of luminance value) is calculated. Depending on the application, the local average may be a weighted average. For example, the stretching algorithm uses both the weighted local average and the global to determine the contrast compensation value. For example, pixels with closer proximity to the target pixel have a higher weight during the computation process. In certain embodiments, the local stretching algorithm is applied directly to the target pixel.

Now referring to FIG. 2. At step 212, a brightness compensation value is determined. Among other things, the brightness compensation value is determined based on the brightness level of the target pixel and the global mean. In a specific embodiment, a predetermined range is provided based on the global mean. If the luminance value of the target pixel falls outside this range, the luminance value is increased (i.e., rendering the target pixel brighter) or decreased (i.e., darkening the pixel). For example, if the target pixel is darker than the global mean the falls outside the predetermined range, the target pixel is darkened. On the other hand, if the target pixel is brighter than the global mean the falls outside the predetermined range, the target pixel is brightened.

At step 213, the target pixel is modified using various compensation values as described above. In a specific embodiment, the compensation values are manipulated to provide a single compensation value for adjusting the target pixel. In other embodiment, the compensation values are individually used to adjust the target pixel. Further, these compensation values may be used in combination.

At step 214, the frame is displayed. Depending on the application the frame may be displayed one pixel at a time. For example, for progressive scan technology, a frame is display one pixel at a time, line by line. It is to be appreciated that embodiments of the present invention are efficient enough to allow pixels to be processed and displayed within the time constraint of real-time video playback.

Figure 7:
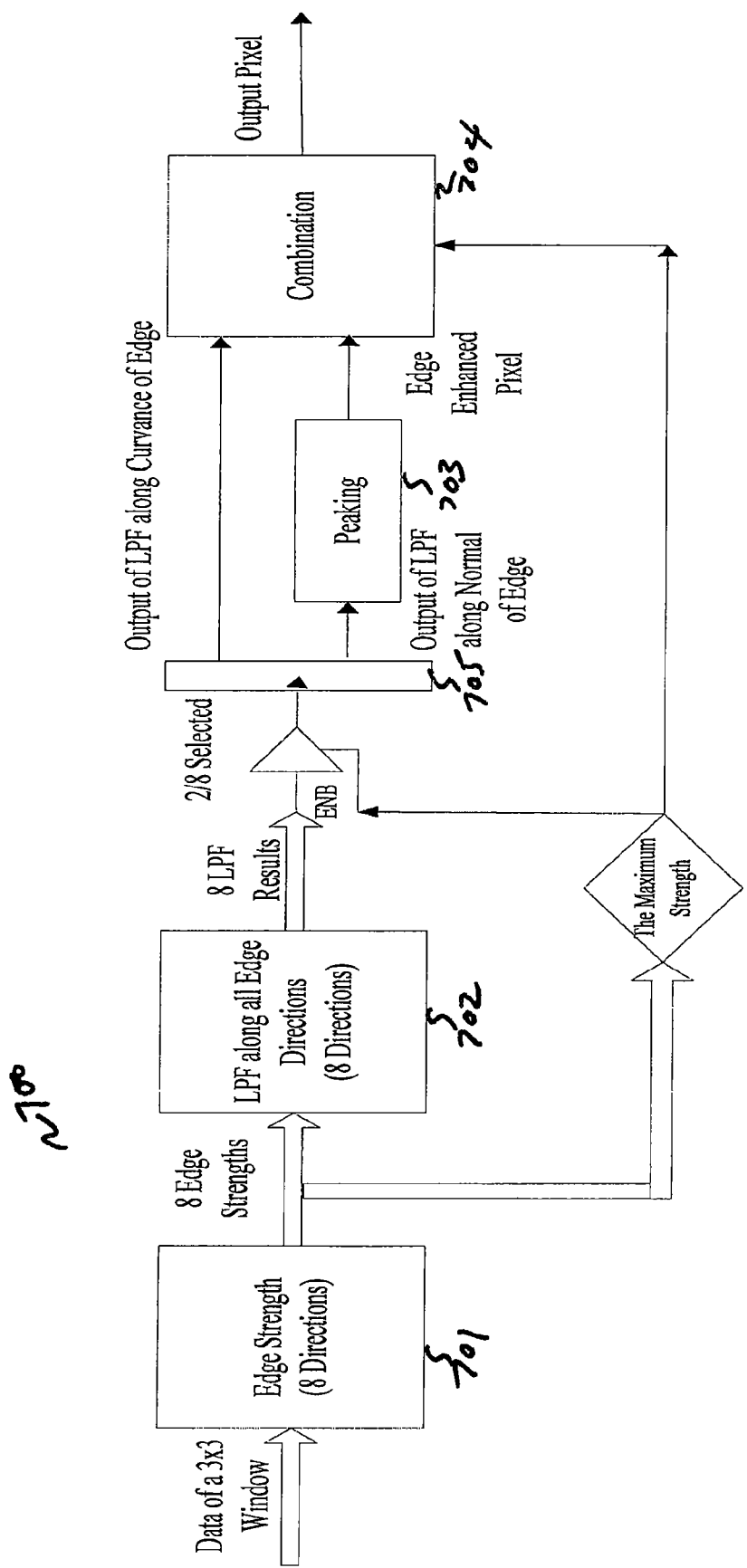
FIG. 7 is a simplified diagram illustrating a process for performing peaking and noise reduction adjustment according to an embodiment of the present invention.

Depending on the application, various steps and/or processes described above may be combined. In a specific embodiment, peaking and noise reduction adjustment are performed in a combined step. These two adjustment both require determining the peaking direction, which in turn yields the noise reduction direction, which is a share step performed. FIG. 7 is a simplified diagram illustrating a process for performing peaking and noise reduction adjustment according to an embodiment of the present invention. This diagram is merely an example, which should not unduly limit the scope of the claims. One of ordinary skill in the art would recognize many variations, alternatives, and modifications.

According to a specific embodiment, during the process 700, data window within an N by N window around a target pixel in an inputted luminance vector is utilized to produce an outputted pixel that has the same position in the outputted luminance vector as the target pixel does in the inputted luminance vector. Then the window slides horizontally and vertically, covering the entire inputted luminance vector so that all pixels in the outputted luminance vector are produced. At the process 701, the strengths of edges in all directions associated with the surrounding pixels around the target pixel within the data window are firstly calculated using a common edge detector so that the maximum edge strength amongst those strengths is obtained. For example, a low pass filter is used at the process 702. At the process 705, two directions are selected: the first one having the maximum edge strength and the second one that is orthogonal to the first one. For example, that the first direction represents the normal of the authentic edge, and the second direction, according to theory of orthogonally, represents the curvance of edge. AT the process 703, along the first direction, the target pixel is enhanced using a one-dimensional peaking algorithm. Along the second direction, pixels are smoothed by a low-passed filter concurrently. At the process 704, results gained from mentioned two directions are combined in a weighted-average manner in that the weight is a function of the maximum edge strength so that a noise-reduced peaking result is produced.

Figure 8:
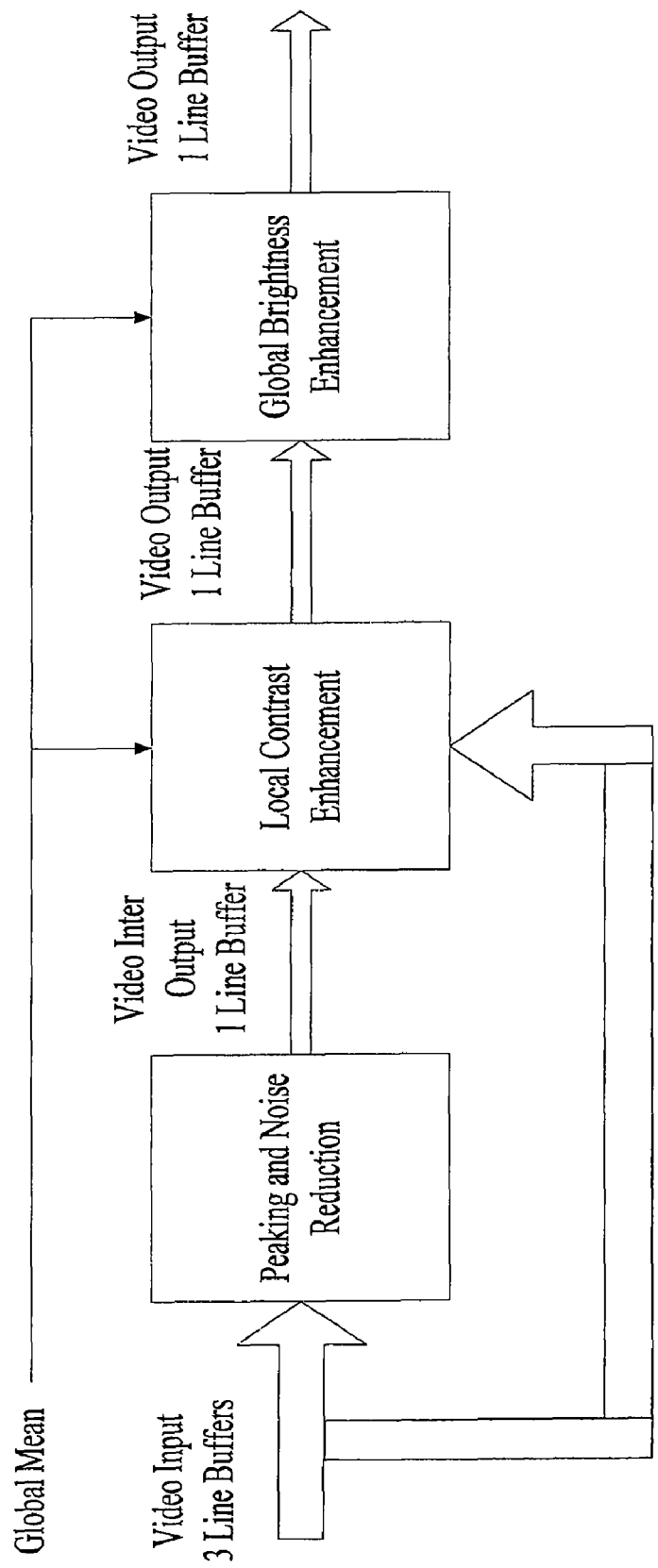
FIGS. 8-10 are simplified diagram illustrating processes for performing video enhancements according to embodiments of the present invention.
Figure 9:
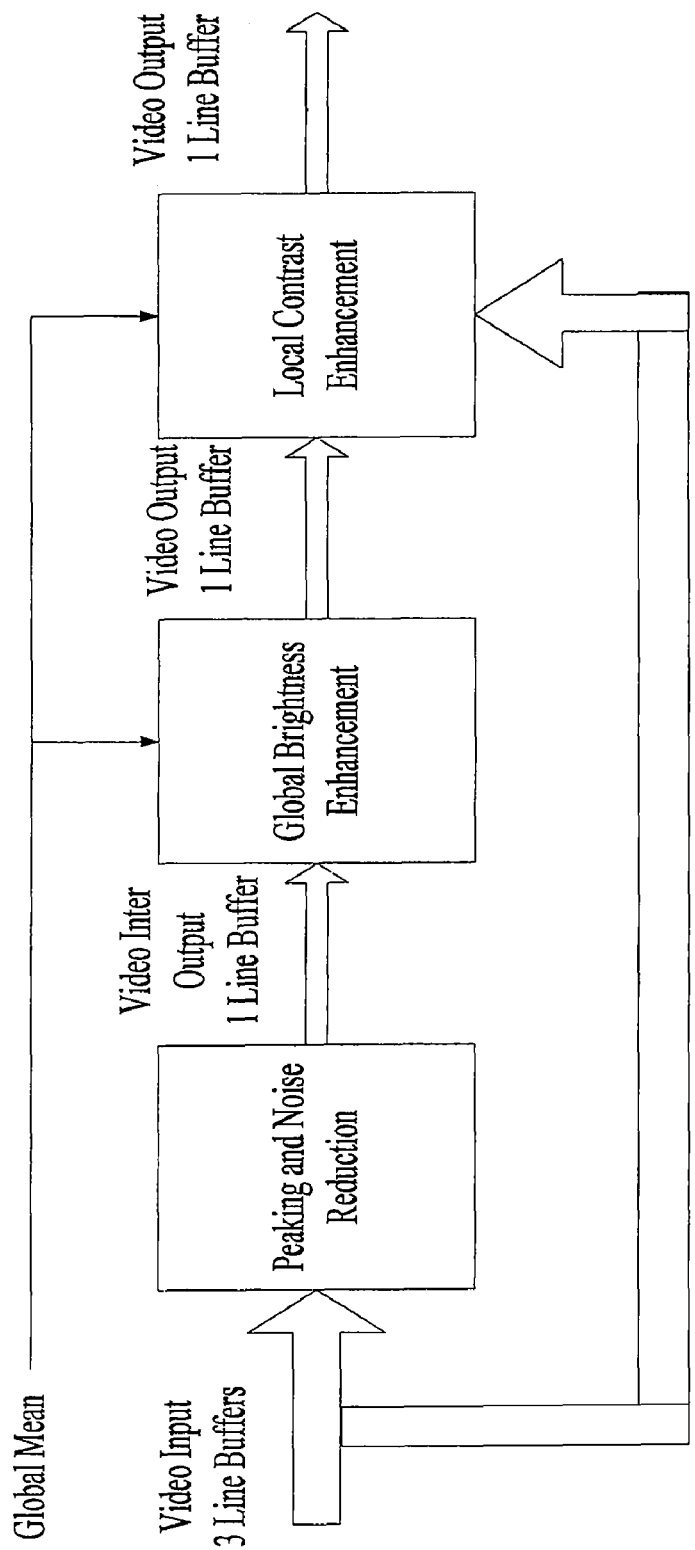

It is to be appreciated that embodiments of the present invention are flexibly implemented. FIGS. 8-9 are simplified diagram illustrating processes for performing video enhancements according to embodiments of the present invention. These diagrams are merely an example, which should not unduly limit the scope of the claims. One of ordinary skill in the art would recognize many variations, alternatives, and modifications.

As shown in FIG. 8, a system receives a luminance vector of a digital image or video frame as the input. In a specific embodiment, the digital image or video frame is converted into YUV format before the processing. First, a directional peaking module is used in conjunction with a directional noise reduction module. For example, the output of these two modules is obtained concurrently. In an embodiment, the outputs of the two modules are combined in a weighted-average manner. The combined output is then fed into a local contrast stretching module together with a control signal, and the result of which is send to a global contrast stretching and brightness enhancement module so that the final output is obtained. For example, the final result is a luminance vector of the outputted digital image or video frame.

Subsequently, a local contrast stretching module receives the processed target pixel after noise reduction and peaking adjustment. The N by N data window and a control signal are used as an input. Preferably, the control signal is a function of the average pixel value of the entire luminance vector, i.e., the global mean. The weighted mean of the pixel values within the data window is calculated, which is referred as the local mean. The output of mentioned local contrast stretching module is then calculated by subtracting a function of the global mean and the local mean from the first constant, and then added upon the noise-reduced peaking result.

Next, the locally stretched luminance vector is provided for a global contrast and/or brightness enhancement module in a pixel-by-pixel manner. The global contrast and brightness enhancement module uses the global mean as an input, which is utilized to produce an adjusting indicator. In a specific embodiment, a second-order polynomial of the target pixel is determined. Three coefficients of mentioned polynomial are functions of the adjusting indicator. The result of the polynomial is the final output of the method and system for directional peaking, directional noise reduction and dynamic contrast and brightness enhancement for digital images and video frames/fields.

FIG. 9 illustrates an alternative embodiment according to the present invention. As shown, peaking module and directional noise reduction module are performed first, followed by the global contrast and brightness enhancement, and finally, the local contrast stretching module is applied.

Figure 10:
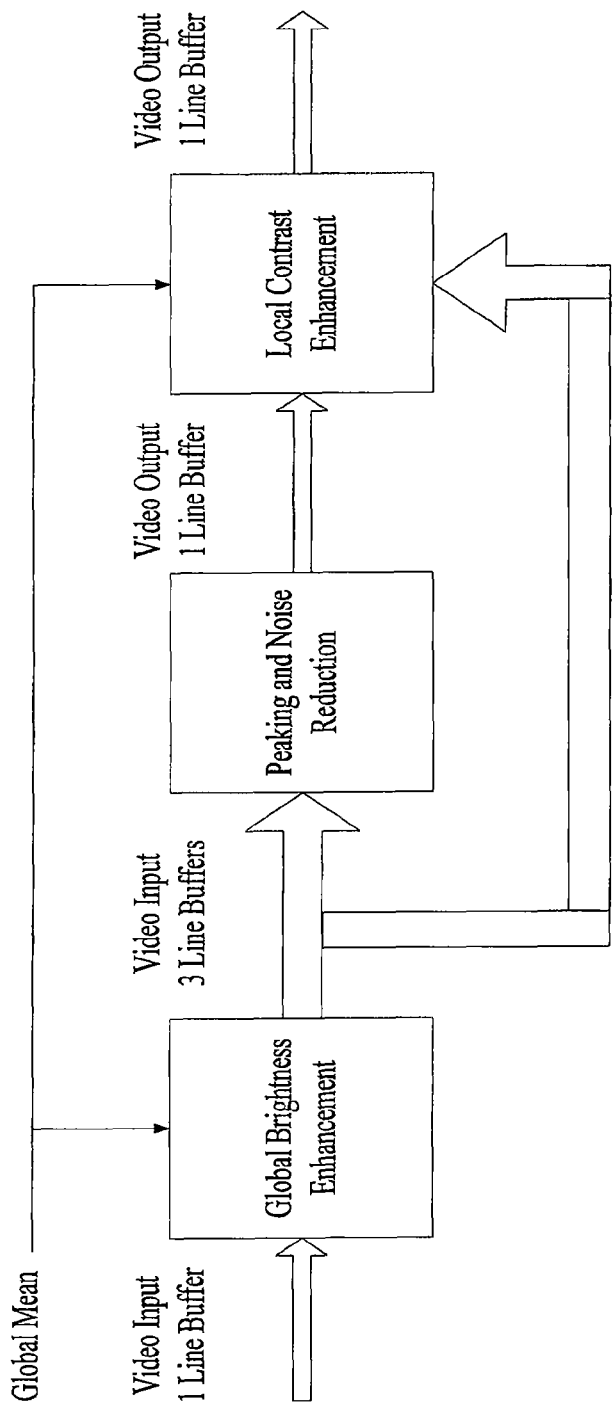

FIG. 10 illustrates an alternative embodiment according to the present invention. As shown, global contrast and brightness enhancement is performed first, followed by the directional peaking module and directional noise reduction module, and finally, the local contrast stretching module is applied.

It is to be understand that there are other embodiments as well, and these embodiments can be flexibility implemented for a variety of applications and systems. For example, various techniques may be implemented as a software component for a variety of imaging and/or video applications, for both viewing and editing. In addition, these techniques can be implemented into embedded hardware systems, such as video processing boards. There are other applications as well.

It is to be appreciated that embodiments according to the present invention offer various advantages over conventional techniques. For example, the embodiments of the present invention provide an integrated and efficient solution for enhancing videos and/or images. In a specific embodiment, the present invention provides a mechanism for saving computational resources by using novel and advanced image processing techniques. In another embodiment, the present invention provides a technique for performing different enhancements (e.g., peaking adjustment and noise reduction) in parallel, thus reducing processing time. Furthermore, embodiments of the present invention can be integrated into conventional software and hardware systems with ease. There are other benefits as well.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computing device implemented method for processing videos or images in a computing device, the method comprising:
    providing to the computing device, a target pixel, the target pixel being characterized by a first pixel value;
    obtaining with the computing device, a plurality of surrounding pixels, the plurality of surrounding pixels being positioned within a predetermined area surrounding the target pixel;
    selecting with the computing device, a transition pixel from the plurality of surrounding pixels, the transition pixel being characterized by a second pixel value, the transition pixel being associated with a greatest transition value, the greatest transition value being a function of the first pixel value and the second pixel value;
    determining with the computing device, a first direction, the first direction being parallel to a second direction from the target pixel to the transition pixel;
    determining with the computing device, a line of surrounding pixels, the line of surrounding being characterized by a third direction, the third direction being perpendicular to the second direction;
    determining with the computing device, noise compensation value, the noise compensation value being a function of the first pixel value and pixel values of the line of surrounding pixels;
    determining with the computing device, a peaking compensation value, the peaking compensation value being a function of the first pixel value and the second pixel value; and
    adjusting with the computing device, the first pixel value based on at least the noise compensation value and the peaking compensation value.

2. The method of claim 1 further comprising determining with the computing device, a weighted averaged using the peaking compensation value and the noise compensation value.

3. The method of claim 1 further comprising buffering with the computing device, three lines of pixels, the three lines of pixels including the target pixel and the plurality of surrounding pixels.

4. The method of claim 1 further comprising buffering with the computing device, five lines of pixels, the five lines of pixels including the target pixel and the plurality of surrounding pixels.

5. The method of claim 1 wherein the selecting with the computing device, a transition pixel comprises:
    determining with the computing device, a plurality of transition values, each of the plurality of transition values being associated with one of the surrounding pixels;
    selecting with the computing device, the greatest transition value.

6. The method of claim 1 wherein the surrounding pixels include twenty four pixels.

7. The method of claim 1 further comprising:
    determining with the computing device, a global mean;
    performing with the computing device, a brightness adjustment using the global mean.

8. The method of claim 1 further comprising:
    determining with the computing device, a global mean;
    determining with the computing device, a local mean based on the plurality life surrounding pixels;
    performing with the computing device, a contrast adjustment using the global mean and the local mean.

9. The method of claim 1 wherein the first value comprises a luminance level of the target pixel.

10. The method of claim 1 wherein the greatest transition value.

11. The method of claim 1 wherein the surrounding pixels include eight pixels, the eight pixels being adjacent to the target pixel.

12. A computing device implemented method for processing videos or images in a computing device, the method comprising:
    providing to the computing device, a frame, the frame including a known number of pixels;
    determining with the computing device, a global mean, the global mean being a first luminance value associated with the known number of pixels;
    selecting with the computing device, three horizontal lines of pixels;
    buffering with the computing device, the three horizontal lines of pixels, the three horizontal lines including a top line, a middle line, and a bottom line;
    selecting with the computing device, a target pixel from the middle line, the target pixel being characterized by at least a second luminance value;
    selecting with the computing device, eight surrounding pixels, the eight surrounding pixels being adjacent to the target pixel;
    determining with the computing device, a first direction based on a transition between the target pixel and a transition pixel, the transition pixel being one of the eight surrounding pixels;
    determining with the computing device, a second direction, the second direction being perpendicular to the first direction;
    determining with the computing device, a peaking compensation value, the peaking compensation value being associated with the first direction;
    determining with the computing device, a noise compensation value, the noise compensation value being associated with the second direction;
    determining with the computing device, a contrast compensation value based on the global mean and a local mean;
    determining with the computing device, a brightness compensation value based on the global mean and the first luminance level;
    modifying with the computing device, the target pixel; and
    displaying with the computing device, the frame.

13. The method of claim 12 wherein the determining with the computing device, a first direction comprises:
    comparing with the computing device, the target pixel to the surrounding pixels;

selecting with the computing device, the transition pixel, the transition pixel being characterized by a greatest transition value in comparison to transition values of the surrounding pixels.

14. The method of claim 12 wherein the local mean is associated with an average of pixel values associated with the surrounding pixels and the target pixel.

15. The method of claim 12 wherein the global mean comprises an average luminance value.

16. The method of claim 12 further comprising determining with the computing device, a global luminance range.

17. The method of claim 12 wherein the modifying with the computing device, the target pixel comprises:
determining with the computing device, a weighted average value based on the peaking compensation value, the noise compensation value, the contrast compensation value, and the brightness compensation value;
modifying with the computing device, the second luminance value using the weighted average value.

18. A computing device implemented method for processing videos or images in a computing device, the method comprising:
receiving with the computing device, a frame, the frame being characterized by a first number of horizontal lines and a second number of pixels;
determining with the computing device, a global mean for the second number of pixels;
storing with the computing device, a first line, a second line, and a third line of pixels at a buffer;
performing with the computing device, at least a first brightness adjustment for the second line of pixels based on the global mean;
performing with the computing device, at least a first contrast adjustment for the second line of pixels based on information from the first line and the third line of pixels;
removing with the computing device, the first line of pixels from the buffer;
storing with the computing device, a fourth line of pixels at the buffer;
performing with the computing device, at least a second contrast adjustment for the third line of pixels based on information from the second line and the fourth line of pixels;
performing with the computing device, at least a second brightness adjustment for the third line of pixels based on the global mean; and
displaying with the computing device, the frame.

19. The method of claim 18 further comprising:
receiving with the computing device, a video file, the video file including the frame;
playing with the computing device, the video in real time.

20. The method of claim 18 further comprising receiving with the computing device, the frame from a network interface.

21. The method of claim 18 wherein the performing with the computing device, at least a first brightness adjustment comprises:
selecting with the computing device, a target pixel, the target pixel being characterized by a luminance level;
modifying with the computing device, the luminance level based on the global mean.

22. The method of claim 18 further comprising:
removing with the computing device, the second line of pixels from the buffer;
storing with the computing device, a fifth line of pixels at the buffer;
performing with the computing device, at least a third contrast adjustment for the fourth line of pixels based on information from the third line and the fourth line of pixels.

23. The method of claim 18 wherein the global mean comprises an average luminance value.

24. The method of claim 18 wherein the performing with the computing device, at least a first contrast for the second line comprises:
selecting with the computing device, a target pixel from the second line;
selecting with the computing device, eight surrounding pixels from the first line, the second line, and the third line;
determining with the computing device, a local mean based on the eight surrounding pixels.

25. A system for processing videos or images, the system comprising:
a storage, the storage being configured to store at least a frame, the frame being characterized by a first number of horizontal lines and a second number of pixels;
a buffer memory;
a processor;
a user interface; and a display;
wherein:
the processor is configured to determine a global mean for the second number of pixels;
the buffer memory is configured to store a first line, a second line, and a third line of pixels;
the processor is further configured to perform at least a first brightness adjustment for the second line of pixels based on the global mean;
the processor is further configured to perform at least a first contrast adjustment for the second line of pixels based on information from the first line and the third line of pixels;
the buffer memory is configured to remove the first line of pixels and to store a fourth line of pixels after the first contrast adjustment and the first brightness adjustment are performed;
the processor is further configured to perform at least a second contrast adjustment for the third line of pixels based on information from the second line and the fourth line of pixels;
the processor is further configured to perform at least a second brightness adjustment for the third line of pixels based on the global mean.

26. The system of claim 25 further comprising a network interface for receiving the frame.

27. The method of claim 1 wherein the computing device is implemented within a device selected from a group consisting of: a computer system, a telephone, a video player, a media player, a set-top box, television, mobile device.

28. The method of claim 12 wherein the computing device is implemented within a device selected from a group consisting of: a computer system, a telephone, a video player, a media player, a set-top box, television, mobile device.

29. The method of claim 18 wherein the computing device is implemented within a device selected from a group consisting of: a computer system, a telephone, a video player, a media player, a set-top box, television, mobile device.

* * * * *